United States Patent
Kalam et al.

(10) Patent No.: US 12,425,882 B2
(45) Date of Patent: Sep. 23, 2025

(54) SYSTEM AND METHOD USING DYNAMIC THROUGHPUT SENSING TO IMPROVE MESH NETWORK PERFORMANCE

(71) Applicant: DISH Network Technologies India Private Limited, Bangalore (IN)

(72) Inventors: Arun Pulasseri Kalam, Bengaluru (IN); Vinay Kumar Reddy Kommireddy, Mitnala (IN)

(73) Assignee: DISH Network Technologies India Private Limited, Bangalore (IN)

( * ) Notice: Subject to any disclaimer, the term of this patent is extended or adjusted under 35 U.S.C. 154(b) by 380 days.

(21) Appl. No.: 18/091,205

(22) Filed: Dec. 29, 2022

(65) Prior Publication Data
US 2024/0224073 A1    Jul. 4, 2024

(51) Int. Cl.
| | | |
|---|---|---|
| *H04W 24/02* | (2009.01) | |
| *H04W 84/12* | (2009.01) | |
| *H04W 84/18* | (2009.01) | |
| *H04W 88/08* | (2009.01) | |

(52) U.S. Cl.
CPC ............ *H04W 24/02* (2013.01); *H04W 84/12* (2013.01); *H04W 84/18* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2008/0300055 A1* | 12/2008 | Lutnick | G06V 40/107 463/39 |
| 2018/0321687 A1* | 11/2018 | Chambers | G06Q 30/0261 |
| 2024/0022919 A1* | 1/2024 | Valenza | H04W 16/225 |

OTHER PUBLICATIONS

Dang et al., "A Novel Passive Indoor Localization Method by Fusion CSI Amplitude and Phase Information," *Sensors* 19:875, 2019 (20 pages).

\* cited by examiner

*Primary Examiner* — Faruk Hamza
*Assistant Examiner* — Cassandra L Decker
(74) *Attorney, Agent, or Firm* — Seed Intellectual Property Law Group LLP (57) ABSTRACT

The present disclosure is directed to a mesh node to enhance a Wi-Fi connection throughput in an area with a weak coverage of an access point (AP). The mesh node provides an intermediate communication node that is moving to locations of the area which needs an improvement of the Wi-Fi connection throughput. A docking station is fixed in each location with a weak Wi-Fi connection throughput to provide a long-term energy source for the mesh node. Each docking station includes a power source to be coupled to the mesh node. The mesh node includes a transit power supply which provides a sufficient electrical energy during movements of the mesh node from a first location to a second location. Thus, the mesh node is capable of maintaining the Wi-Fi connection even during the movements between some locations.

17 Claims, 7 Drawing Sheets

SYSTEM AND METHOD USING DYNAMIC THROUGHPUT SENSING TO IMPROVE MESH NETWORK PERFORMANCE

BACKGROUND

The present disclosure is directed to using dynamic throughput sensing to improve mesh network performance, and in particular the use of channel state information, speed performance, error checking and other techniques to sense throughput of a Wi-Fi connection and improve it when it falls below a threshold.

Increasing demand to high-speed internet access results in emerging infrastructure networks managed by an EHT (Extremely High Throughput) access point (AP). For instance, IEEE 802.11ax (Wi-Fi 6) or IEEE 802.11be (Wi-Fi 7) provides high-speed internet access by enhancing peer-to-peer (P2P) traffic. Although the new EHT infrastructures provide higher rate of the communication for more communication devices (e.g., devices connected to a router in a house for an internet access over a Wi-Fi protocol), the coverage area from the access point, such as a router, varies based on the surrounding physical environment. Generally, the later communication protocol (e.g., Wi-Fi 7) utilizes higher frequency bands compared with the older protocols. The higher frequency has a lower distance for the coverage range and is more susceptible to interference from physical objects compared with the lower frequency technologies. Due to increasing attenuations from the obstacles in the communication area (e.g., metal cabinets, ovens, walls of the rooms in a house), the range might become less.

BRIEF SUMMARY

The inventors have realized that the throughput of a Wi-Fi connection in an area can change over time. The wireless throughput to a client device can be directly from an Access Point (AP) or be from the AP to a mesh device, which boosts the wireless signal and outputs it to a larger physical range. In their studies, they have realized that the throughput can be affected by local obstacles between the AP and the client device, the AP and the mesh node and/or the mesh node and the client. The AP may be a router which broadcasts a wireless signal having internet access from a specific location in a building, (e.g., a house, a warehouse, or university campuses). The mesh node provides an intermediate communication node that can be can be used to boost the signal to improve the Wi-Fi connection throughput. The mesh node provides an increased range for the wireless internet connection between the AP and one or more client devices (e.g., smartphone, laptops, computers, or sensors for Internet of Things (IoTs)).

When the AP is first placed, along with a mesh node, if present, the Wi-Fi connection throughput can be measured in the different locations of the area to determine that the Wi-Fi connection throughput is above a selected threshold at all locations in which a client device is likely to be used. These measurements are taken at the time the network is set up and take into account the then current physical objects in the Wi-Fi environment. At a later point in time, the location of physical objects in the Wi-Fi environment might change. The user might move objects to different locations in the room, for example, change the location of a couch, chair, vase, picture or other object. The user might introduce new objects into the environment, such as microwave oven, a metal filing cabinet, and the like.

According to one embodiment, a method is provided for dynamically improving local Wi-Fi throughput. According to this method, communications are received at a client device on Wi-Fi during a first time frame. Then the Wi-Fi throughput within a Wi-Fi coverage zone during the first time frame is determined. Image data is collected during the first time frame from an image sensor of a first plurality of objects within the Wi-Fi coverage zone during the first time frame. During a second time frame communications are received at the client device via Wi-Fi and the throughput is determined. Image data is collected during the second time frame from an image sensor of a second plurality of objects within the Wi-Fi coverage zone during the second time frame. An alert is output from the client device if the Wi-Fi throughput during the second time frame is below a selected threshold. Data is output to the user indicative of the difference between the first plurality of objects and the second plurality of objects and the location of such different objects.

In one embodiment, an indication of a potential interfering object within the second plurality of objects is output. This can be done by determining objects present in the second image that are not present in the first image, outputting an indication of the identity of the objects present in the second image and not in the first image and outputting an indication of the location of objects present in the second image and not in the first image.

One way to accomplish outputting an indication of a potential interfering object within the second plurality of objects includes storing first data on the client device from a channel state information sensor collected during the first time frame while receiving Wi-Fi communications, storing second data on the client device from the channel state information sensor collected during the second time frame while receiving Wi-Fi communications, comparing a phase difference between the first data and the second data; and outputting an indication of the location at which the phase difference occurred.

In one embodiment, a first fingerprint of the channel state information during the first time frame is created, then, creating a second fingerprint of the channel state information during the second time frame; and outputting a difference between the first fingerprint and the second fingerprint. The first and second fingerprints can include phase information, amplitude information, frequency information and signal to noise ratio.

The image sensor can be a camera in the client device and the client device can be a smartphone.

In one embodiment, a network management system is provided having an access point configured to wirelessly receive and transmit data; a memory in the client device; an executable program stored in a memory of the client device that in operation: stores first data from the channel state information sensor collected during a first time frame; senses a Wi-Fi throughput within a Wi-Fi coverage zone during the first time frame; receives a signal collected during the first time frame from the image sensor of a first plurality of objects within the Wi-Fi coverage zone of the access point; receives second data from the channel state information sensor collected during a second time frame; senses a Wi-Fi throughput during the second time frame; outputs an alert if the Wi-Fi throughput during the second time frame is below a selected threshold; generates a signal indicating a difference between the channel state information during the first time frame and during the second time frame; receives a signal from the image sensor of a second plurality of objects within the Wi-Fi coverage zone of the access point during the second time frame; compares the signal from the image sensor of the first plurality of objects with the image of the second plurality of objects; outputs data indicative of the difference between the objects in the first plurality of objects and the second plurality of objects; and outputs an indication of an interfering object within the second plurality of objects based at least in part on the difference between the first data and the second data and also at least in part on the difference between the objects in the first plurality of objects and the second plurality of objects.

The network management system can include an executable program stored in a memory of the client device that in operation outputs an indication of the objects present in the second image that are not present in the first image.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to various communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
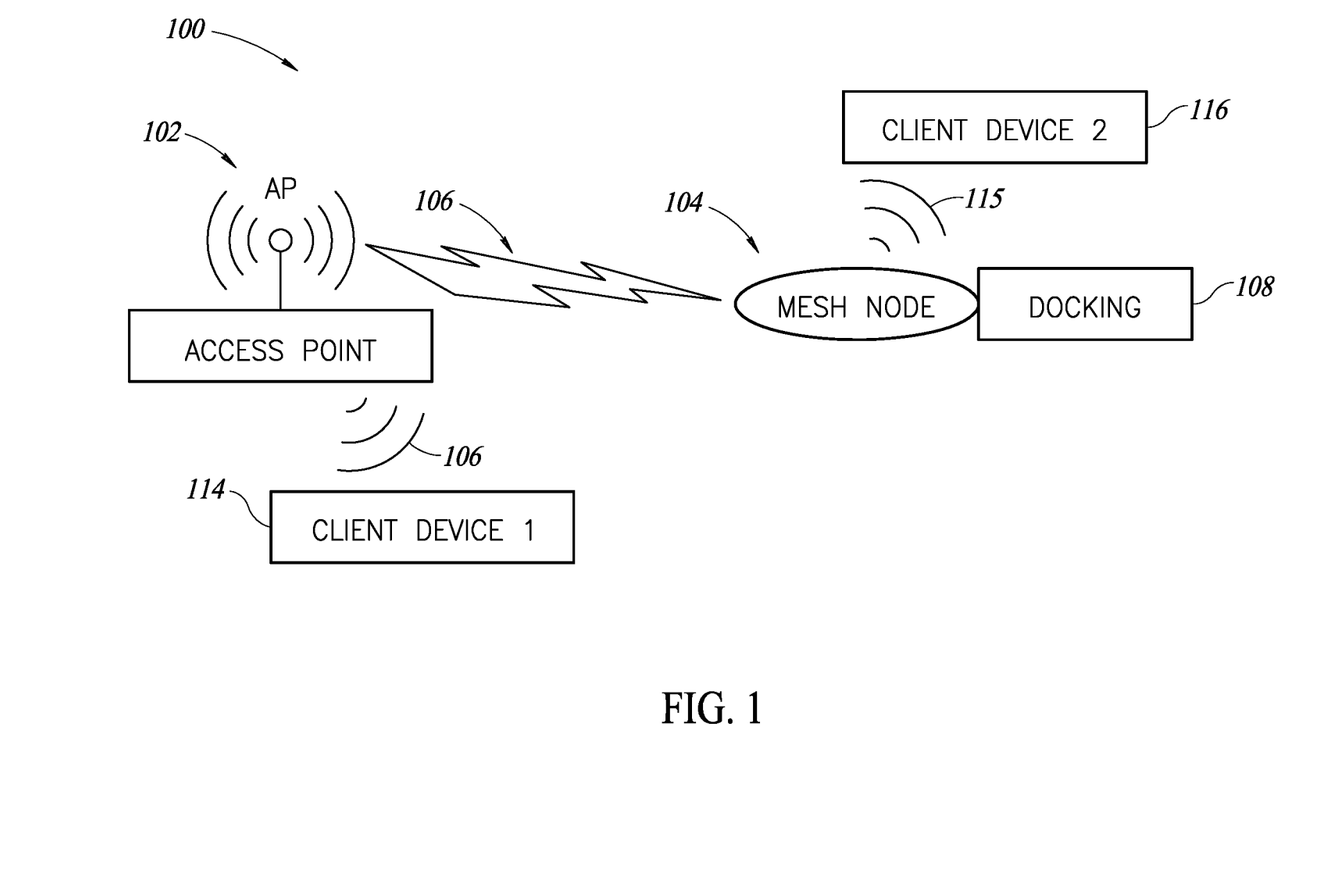
FIG. 1 is a block diagram illustrating a system for providing Wi-Fi connection throughput between an access point and client devices in accordance with embodiments described herein.

FIG. 1 is a block diagram illustrating a system 100 for providing a Wi-Fi connection throughput between an access point (AP) 102 and client devices 114, 116. The AP 102 communicates directly with nearby client devices 114. For client devices spaced farther from the access point 102, a mesh node 104 can be provided. The mesh node 104 operates as an intermediate node to provide the Wi-Fi signal between the AP 102 and the client device 116. The mesh node can receive a medium- or low-power and low-bandwidth Wi-Fi signal from the mesh node 104 and then rebroadcast it having boosted power and increased bandwidth. The mesh node 104 can be in a fixed location and connected to the appropriate power supply, or alternatively, it can be a portable mesh node 104 that can be moved to different locations and plugged into a docking station, such as docking station 108. The docking station 108 is an optional circuit that can be provided if desired, but is not used in many embodiments. If needed, a plurality of docking stations 108 can be provided in different locations. The mesh node 104 can be moved to these different docking stations, and thus, be portable if desired. The number of docking stations depends on the number of locations that need an enhancement of the Wi-Fi connection throughput.

The mesh node 104, whether stationary or portable, is coupled to the AP 102 by a Wi-Fi signal 106, and outputs the signal from it as a boosted Wi-Fi signal 106. The mesh node 104 is capable of coupling to each of the plurality of docking stations 108, being one example, and receiving electrical power from a power source of the respective docking station.

In this embodiment of the system 100, a first client device 114 is positioned in a location that has a Wi-Fi connection throughput greater than a threshold. Thus, the first client device 114 is directly connected to the AP 102 to communicate over the Wi-Fi protocol. However, the second client device 116 is positioned in a location where the Wi-Fi connection throughput is less than the threshold. In this condition, the second client device 116 may lose an internet connection from time to time of the Wi-Fi provided by the AP 102. The mesh node 104 is close enough to the location of the second client device 116 to output and provide a Wi-Fi connection for the second client device 116 of sufficient strength that it has a throughput to a value greater than the threshold. Accordingly, the second client device 116 establishes an internet connection with the Wi-Fi connection throughput greater than the threshold through the mesh node 104.

The client device might be present in different locations in a specific area (e.g., a house, a warehouse, or university campuses). For example, different cell phone users might be in three or four different rooms of a house. The AP and mesh node 104 will experience different Wi-Fi propagation based on their locations in the home and objects between them.

The system 100 provides an Internet access for a plurality of client devices in an area without a need to utilize multiple mesh nodes. In this embodiment, the mesh node 104 enhances the Wi-Fi connection throughput only in a location that one or more client devices exist. In various embodiments, the number of the client devices may be more than the two devices that are described in FIG. 1. For example, a plurality of client devices may be positioned in different locations in the area of the system 100. In this condition, a user may experience different throughput depending on their location, the mesh node 104 location, and the AP 102 location. The position of the mesh node 104 may be dynamically changed by the user. In addition, the location of objects around the network might change from time to time.

In various embodiments of the present disclosure, the AP 102 may be configured to connect to a router (e.g., via a wired/wireless network), as a standalone device, or operate as an integral component of the router itself. A client device such as the client devices 114, 116 may be implemented by any physical wireless network-compatible device (also referred to as a "network device"), e.g., including software implementing a virtual network device, or the like. A client device or network device may include one or more mobile devices and/or one or more stationary devices. Examples of a mobile device include a mobile phone, e.g., a feature phone or a smartphone, a radio message receiver, a tablet, a laptop, a smartwatch, or any mixed form of these device types, among others. Other examples of a client or network device also include wireless headphones, a wireless dock, a wireless speaker, or other devices, which are capable of coupling to a wireless network.

Examples of the wireless network signal 106 described herein may include a Wireless Local Area Network (WLAN), or a personal area network (PAN) such as a wireless PAN (WPAN), a Bluetooth network, or a nonlocal network (such as a Metropolitan Area Network (MAN), a Wide Area Network (WAN), or a Global Area Network (GAN)). The wireless network may include or be formed from of a cellular radio network (e.g., an IEEE 802.11), a Bluetooth network, or another mobile radio network.

Further examples of a wireless network may include Ultra-Wide Band (UWB) network, and/or a WLAN. The WLAN may be provided in accordance with Zigbee, Bluetooth®, Wireless Gigabit Alliance (WiGig) standard, mm Wave standards in general (wireless systems operating at 10-300 GHz and above such as WiGig, IEEE 802.11ad, IEEE 802.11ay, etc.), HiperLAN/2 (High Performance Radio LAN; an alternative ATM-like 5 GHz standardized technology), Vehicle-to-Vehicle (V2V) and Vehicle-to-X (V2X) and Vehicle-to-Infrastructure (V2I) and Infrastructure-to-Vehicle (I2V) communication technologies. Examples of the IEEE 802.11 radio communication standard (also referred to as "IEEE802.11") may include IEEE802.11b, IEEE802.11b, IEEE802.11n (Wi-Fi 4), IEEE802.11ac (Wi-Fi 5), IEEE802.11ax (Wi-Fi 6), IEEE 802.11be (Wi-Fi 7), IEEE802.11a (5 GHZ), IEEE802.11g (2.4 GHz), DSRC (Dedicated Short Range Communications), communication arrangements such as Intelligent-Transport-Systems, and other existing, developing, or future radio communication technologies.

Various aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHZ, 3.6-3.8 GHz and further frequencies and SAS, "Spectrum Access System," in 3.55-3.7 GHZ and further frequencies), IMT-2020 spectrum (expected to include 3600-3800 MHZ, 3.5 GHz bands, 700 MHz bands, bands within the 24.25-86 GHz range, unlicensed spectrum ranges 2.4-2.5 GHzs, 5-6 GHz, 6-7 GHZ, etc.), spectrum made available under FCC's "Spectrum Frontier" 5G initiative (including 27.5-28.35 GHz, 29.1-29.25 GHz, 31-31.3 GHZ, 37-38.6 GHz, 38.6-40 GHz, 42-42.5 GHZ, 57-64 GHz, 64-71 GHz, 71-76 GHz, 81-86 GHz, and 92-94 GHz, etc.), the ITS (Intelligent Transport Systems) band of 5.9 GHZ (typically 5.85-5.925 GHZ) and 63-64 GHZ, bands currently allocated to WiGig such as WiGig Band 1 (57.24-59.40 GHZ), WiGig Band 2 (59.40-61.56 GHZ), WiGig Band 3 (61.56-63.72 GHZ), and WiGig Band 4 (63.72-65.88 GHz), the 70.2 GHz-71 GHz band, any band between 65.88 GHz and 71 GHz, bands currently allocated to automotive radar applications such as 76-81 GHZ, and future bands including 94-300 GHz and above. Furthermore, some aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc., applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum, e.g., with highest priority to tier-1 users, followed by tier-2, then tier-3, etc., users. Aspects described herein can also use radio communication technologies with different Single Carrier or OFDM flavors (CP-OFDM, SC-FDMA, SC-OFDM, filter bank-based multicarrier (FBMC), OFDMA, etc.), and in particular 3GPP NR (New Radio), which can include allocating the OFDM carrier data bit vectors to the corresponding symbol resources. Furthermore, aspects described herein may also use radio communication technologies with "AFC" (Automatic Frequency Coordination), e.g., for U-NII-5 or 7 (Unlicensed National Information Infrastructure 5 or 7).

Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The modulation coding scheme (MCS) index is a metric that provides several parameters to measure the Wi-Fi connection between two stations. It includes data such as the modulation type, the coding rate, the number of spatial streams, the channel width, the guard interval, and many other factors. The use of MCS to measure and determine preferred Wi-Fi connections is known in the art and also provided with respect to the 802.11 AC standard and therefore need not be discussed in detail in this application.

Another technique for measuring and understanding the throughput between two stations is to review the channel state information (CSI) as the communication signals are transferred between two circuits connected in Wi-Fi. The CSI between two systems can provide a fingerprint for the transmission paths, interferences and characteristics of the Wi-Fi connection. The CSI signal contains many physical layers and information that are provided during the signal transmission that describe the signal characteristics such as amplitude and phase of each subcarrier wave in the channel. The CSI can also describe the communication link properties of the signal between the transmitter and receiver. The data can be used to understand signal reflection diffraction and other interference factors of the signal. The CSI signal therefore represents the combined effects of channel status such as scattering fading multipath interference shattering power decay. Further, each CSI packet includes information such as a timestamp, RSSI, number of antennas, noise and other CSI information. The existence of the CSI signal and its properties are known in the art and therefore further details need not be described herein.

Figure 2:
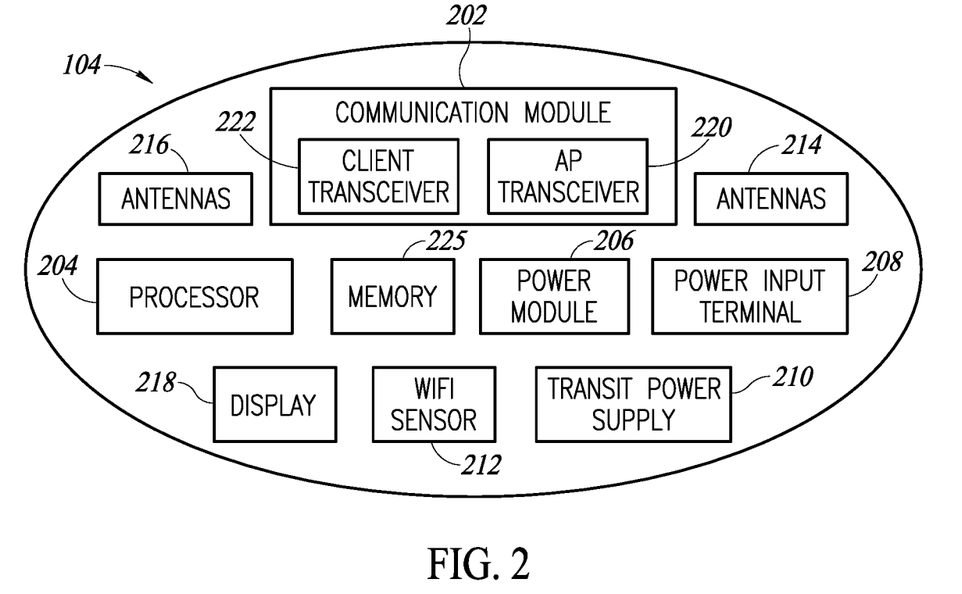
FIG. 2 is a block diagram illustrating internal components inside a mesh node in accordance with embodiments described herein.

FIG. 2 is a block diagram illustrating internal components inside the mesh node 104 described in FIG. 1. The mesh node 104 includes a communication module 202, a processor 204, a power module 206, a power input terminal 208, a power supply 210, a sensor 212, a first set of antennas 214, a second set of antennas 216, a memory 225, and a display 218. The communication module 202 includes an AP transceiver 220 and a client transceiver 222. In various embodiments, internal components of the mesh node 104 may include some, more, or less components than the depicted block diagrams in FIG. 2.

The communication module 202 communicates by the AP 102 of FIG. 1 through the AP transceiver 220 and the first set of antennas 214. The communication module 202 communicates by the client device 116 of FIG. 1 through the client transceiver 222 and the second set of antennas 216. In various embodiments, a plurality of client devices is distributed in a location around the docking station 108. The communication module 202 may include an internal amplifier to amplify the received signals from each of the client device 116 and the AP 102 to be transmitted to each other. Hence, the client device 116 is able to achieve an internet access by the Wi-Fi connection throughput to the AP 102 greater than the threshold, even when it is positioned in a location that is not in the coverage of the AP 102.

The power module 206 may include voltage regulators, converters, inverters, and any other components that are needed to transfer the received electrical power from the power input terminal 208. An optional transit power supply 210 can be provided, but is not required. The power module 206 supplies the received power into the other components such as the communication module 202, the processor 204, and the sensor 212. The power module 206 may include different converter and regulation circuits coupled to each of the power input terminal 208 and the transit power supply 210. In this condition, the power received from the power input terminal 208 is greater than the power received from the transit power supply 210, and consequently a different regulation and converter circuits are coupled to the power input terminal 208 rather than the regulation and converter circuits coupled to the transit power supply 210.

The power input terminal 208 includes a power socket to be coupled to an external power source such as the docking stations 108. In various embodiments, the power socket may be compatible with any plug types (e.g., Type-C, Type-B, Type-F, and Type-A). The power socket may also include USB port and other type of ports to be coupled to the external power source. In addition, the power input terminal 208 may include a wireless power transfer (WPT) module to wirelessly receive electrical energy from a wireless power transmitter of the docking station.

The transit power supply 210 may include a supercapacitor. The supercapacitor may have a capacity to provide the sufficient electrical energy for the components of the mesh node 104 for a selected period of time. In some examples, the period of time may be a few minutes (e.g., 10 min). This period of time provides the opportunity to move the mesh node 104 from a docking station to another docking station without interruptions in the Wi-Fi connection throughput. In addition, or in place of a supercapacitor, a battery, whether standard or rechargeable battery may be used to increase the period of time that the mesh node operates without the need to be coupled to an external energy source. Alternatively, an external rechargeable battery can be coupled to the power module 206 when a user needs the mesh node 104 to operate for a longer period of time without coupling to the docking stations 108.

In some embodiments, the power module 206 may include a battery management system (BMS) to detect the type of battery that is coupled to the transit power supply 210 and read the state of charge (SoC) of the coupled battery. In this condition, the BMS sends the SoC to the processor 204 to determine an operation mode of the mesh node 104 based on the SoC of the battery. The processor 204 may send the SoC to the display 218 to inform the user about the remaining time of operation without connection to the docking station. In a same condition, the power module 206 may send an indicative signal to the processor 204 for indicating if the mesh node 104 is coupled to a docking station or is using electrical energy of the transit power supply 210. In response, the processor 204 may change the operation mode of the mesh node 104 to a low-power mode. In addition, the BMS may transfer a portion of power from the power input terminal 208 into the transit power supply 210 to charge the supercapacitor or the rechargeable battery when the mesh node 104 is coupled to the docking station.

The processor 204 determines if the mesh node 104 is coupled to a docking station (e.g., 108) or operates with the power of the transit power supply 210. If the processor 204 determines that the mesh node 104 is coupled to a docking station, then it may send a command to the communication module 202 to operate in a normal mode. During the normal mode operation, the communication module 202 utilizes all the antennas (e.g., 214 and 216) and operates in the highest transmission and receiving data rate over a Wi-Fi protocol. For instance, in the normal mode the communication module 202 may operate in Wi-Fi 7 protocol with a rate of about 40 Gbps. In this example, the communication module 202 may also operate in Multi-Link Operation (MLO) mode which increases Wi-Fi connection throughput. If the processor 204 determines that the mesh node 104 is not coupled to the docking station, then it may send a command to the communication module 202 to operate in a low-power mode. During the normal mode, it will charge the supercapacitor and/or rechargeable battery, if either is present, and maintain them fully charged.

In the low-power mode operation, the communication module 202 may change the rate of the communication to reduce the power consumption. For instance, the communication module 202 may change the Wi-Fi connection protocol from Wi-Fi 7 to a lower rate protocol such as Wi-Fi 6 or 6E with a rate of about 9.6 Gbps or Wi-Fi 5 with a rate of about 6.9 Gbps. The lower rate of data results in lower power consumption. In addition, the communication module 202 may reduce the number of active antennas in each of the antenna sets 214 and 216. For example, the Wi-Fi connection may operate in a multi-input multi-output (MIMO) topology by 8 antennas in the antenna set 214 and 8 antennas in the antenna set 216 (which refers to 8×8 MIMO system used in Wi-Fi 6). In this condition, the communication module 202 may change the MIMO topology from 8×8 MIMO to 4×4 MIMO by deactivating half of the antennas from each of the antenna sets 214 and 216 (e.g., 4×4 MIMO system used in Wi-Fi 5). Reducing the number of antennas results in reduction of power consumption of the mesh node 104 when it is operating in the low-power mode.

In some embodiments, the communication module 202 may limit the number of client devices coupled to the mesh node 104 when it is operating in the low-power mode. For example, a threshold of number of client devices that can be connected to the mesh node 104 may be stored in the processor 204. When the processor 204 sends the command of low-power operation to the communication module 202, it may determine the number of the client devices that are connected to the mesh node 104. In response, the processor 204 compares the number of the client devices with the threshold of number of client devices. If the number of the client devices coupled to the mesh node 104 exceeds the threshold, then the processor 204 may prioritize the client devices and disconnect the client devices with lower priority compared with the other client devices. The priority, for example, may be introduced based on the data rate that each client device is using or based on a time period of connection of each client device to the mesh node 104. By limiting the number of the client devices in the low-power mode operation, the mesh node 104 consumes less electrical energy compared with the normal mode operation.

The sensor 212 may include an MCS sensor and also a CSI sensor. Only a single box for sensor 212 is shown, but it is to be understood that this box can include multiple sensors, including amplitude sensors, phase information, and other types of sensors for creating an MCS index and also collecting all the data associated with the CSI signal. In addition, it includes a sensor for determining the Wi-Fi connection throughput. It can measure the Wi-Fi connection throughput between the AP 102 and the mesh node 104 and also between the mesh node in the client device. The sensor 212 sends a throughput indicative signal to the processor 204 indicating the Wi-Fi connection throughput between the AP 102 and the mesh node 104. The processor 204 compares the throughput indicative signal with the throughput threshold. If the throughput indicative signal is less than the throughput threshold, then the processor 204 displays an alert message in the display 218. Thus, the user is notified when the mesh node 104 is no longer communicating with the client device at the requested throughput. If the data throughput falls below a selected threshold value, then an alert is sent to the client device thus the user of the client device can take steps to improve the throughput.

The throughput is a measure of the amount of information, namely data which is passed between the two devices within a given amount of time. In a data transmission, network throughput is the amount of data that is successfully moved from one place to another within a selected time period. It can be measured in megabytes per second (Mbps) or in gigabytes per second (Gbps).

In some embodiments, the sensor 212 may include a short-range communication measurement system to detect a docking station in proximity of the mesh node 104. In this condition, the short-range communication measurement system sends a short-range signal (e.g., over Bluetooth or near-field communication (NFC) link) to the docking stations in a location (e.g., 108). If the sensor 212 receives an acknowledgement signal from a docking station, then it sends an indicative signal to the processor 204 to display that a docking station is available in proximity of the location of the mesh node 104. In some examples, the acknowledgement signal may include an indicative data about the docking station, such as an identification number of the docking station. The processor 204 may send the identification number of the docking station to the display 218 to notify the user about the presence of the docking station in proximity of the mesh node 104. In various embodiments, the display 218 may include some features such as an alarm LED and a loud speaker that notify the user about exiting the coverage range of the AP 102 and a low-level of the electrical charge of the power supply 210.

The memory 225 stores information that is obtained by the sensor and also the analysis and performance of the system as executed by the processor 204, more details of which are described elsewhere herein.

Even though FIG. 2 has been shown and described as the details for the mesh node 104, the same circuits and functions are also performed by the access point 102. In the overall network, the mesh node is a type of access point. Accordingly, the structure, circuits and function of the mesh node 104 are also present in the access point 102. Accordingly, FIG. 2 should be understood as showing the structure and operation of the access point 102, and the explanation is not repeated herein with respect to the access point 102 since it would be duplicative.

Figure 3:
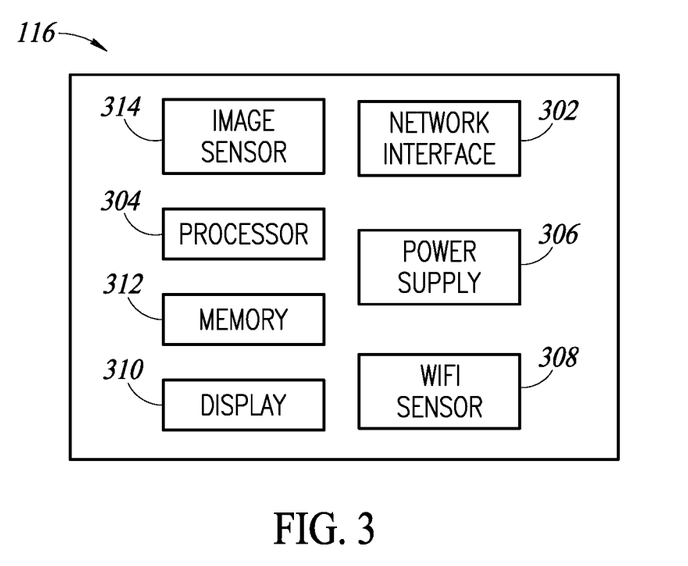
FIG. 3 is a block diagram illustrating an optional docking station in accordance with embodiments described herein.

FIG. 3 is a block diagram illustrating internal components inside the client device 114 or 116. Since the client devices 114 and 116 are the same, the description applies to both of them. In a preferred embodiment, the client device is a smart computing device, such as a smartphone, smartwatch, a notepad computer, notebook computer, a wirelessly connected desktop computer or the like. The client device will therefore include all of the circuits, function and components normally present in such a smart computing device. Only a few such circuits are shown based on their relevance to the present disclosure and it is to be understood that many other circuits and functions will be present in such client device 116.

The client device includes a network interface 302, a processor 304, a power supply 306, a sensor 308, a display 310, a memory 312 and an image sensor 314. In various embodiments, the network interface 302 may wirelessly communicate with the mesh node 104 or the AP 102. The network interface 302 may exchange data with the mesh node 104 about the electrical charge level of the transit power supply 210, the coverage area of the AP 102, and the number of clients present in the location of the docking station 108 to be coupled to the mesh node 104.

The processor 304 reads the data received from the mesh node 104 or the AP 102, depending on which it is communicating with and represents on the display 310 to notify the user of the Wi-Fi throughput in the communication. In some examples, the display 310 may include some features such as an alarm, whether visual or by audio speaker that notify the user that the throughput is below a threshold level.

The sensor 308 may include an MCS sensor and also a CSI sensor. Only a single box for sensor 308 is shown, but it is to be understood that this box can include multiple sensors, including amplitude sensors, phase information, and other types of sensors for creating an MCS index and also collecting all the data associated with the CSI signal. In addition, it includes a sensor for determining the Wi-Fi connection throughput. It can measure the Wi-Fi connection throughput between the AP 102 and/or the mesh node 104 and the client device. Thus, the throughput of data to the client device is sensed by any one of a number of acceptable techniques by the sensor 308. The result of the census is stored in the memory 312. The sensor 308 also sends a throughput indicative signal to the processor 304 indicating the Wi-Fi connection throughput between the client device 116 and the Wi-Fi source, whether AP 102 or the mesh node 104. The processor 304 compares the throughput indicative signal with the throughput threshold. If the throughput indicative signal is less than the throughput threshold, then the processor 304 displays an alert message in the display 310. Thus, the user is notified when the Wi-Fi source is no longer communicating with the client device above the selected threshold. If the data throughput falls below a selected threshold value, then an alert is sent to the client device thus the user of the client device can take steps to improve the throughput, as explained herein. The sensor 308 may be in communication with the sensor 212 and include a communication measurement system so they can exchange data and compare the throughput data that each of the systems calculated.

Specifically, the user client device 116 can send the signal to the Wi-Fi source, whether AP 102 or mesh node 104 and ask to receive information regarding its throughput measurements. The client device therefore has available to it its locally measured throughput measurements as well as the data collected by the source of the Wi-Fi signal.

Figure 4A:
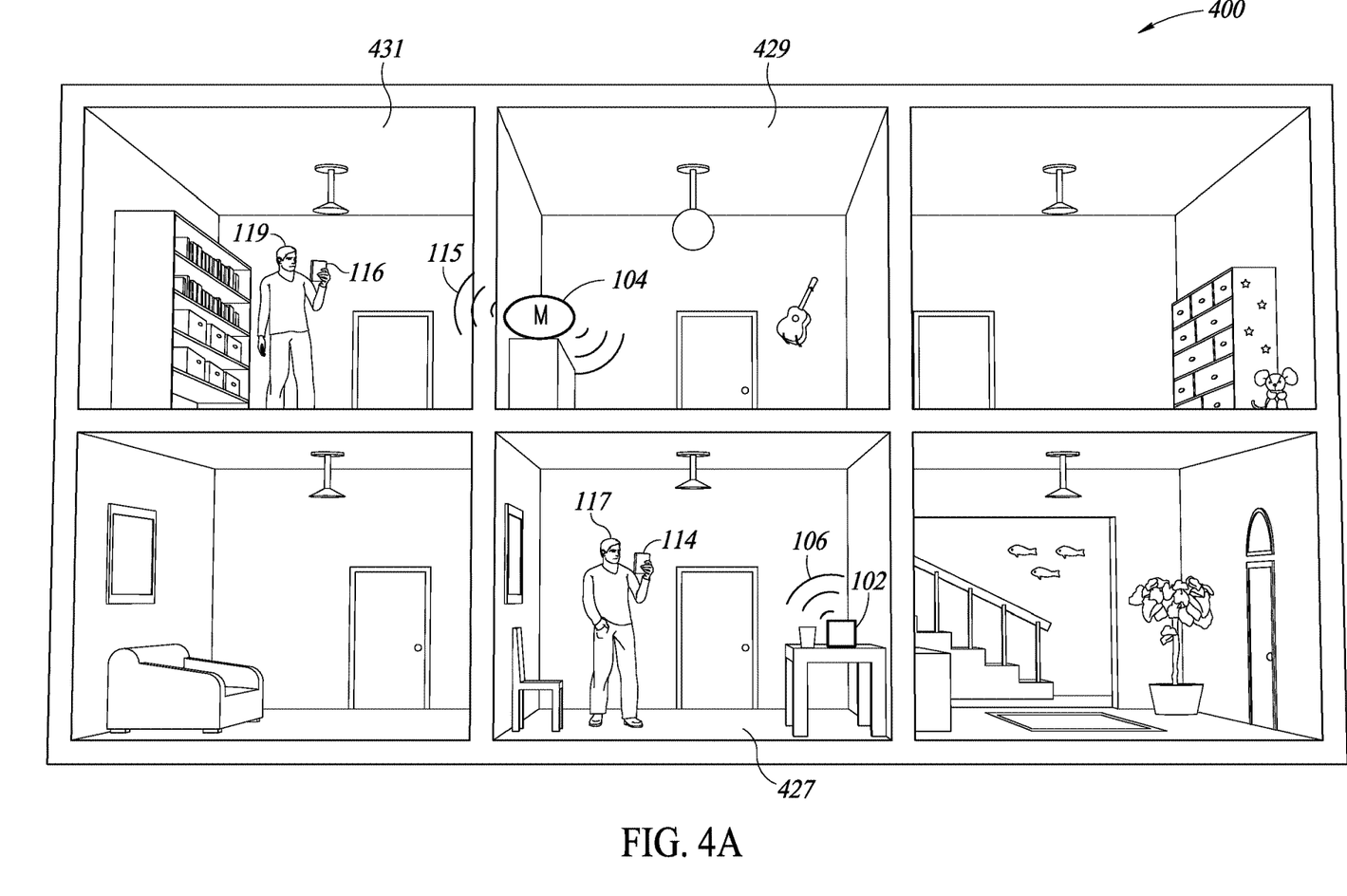
FIG. 4A is an example of a Wi-Fi system in a multi-floor house at a first time according to the present disclosure.

FIG. 4A shows the environment and operation of the network of the present disclosure at a first point in time. In this particular point in time, an access point 102 is outputting a Wi-Fi signal 106. This Wi-Fi signal 106 can be received directly by the client device 114 held by the user 117 in FIG. 4A or by the mesh node 104. A second user 119 may hold the client device 116 in a separate room and receive the signal 115 from the mesh node 104. At a first point in time, such as when the Wi-Fi network is originally set up, a throughput test is carried out between the node and the client device. The result of the throughput test is compared to the expected optimum performance for given MCS based on various testing. The data from such tests, along with other information, such as the number of re-attempts, the number of times the Wi-Fi configuration is changed within an MCS, and other data, will provide a course level of the performance indicator. If the performance is good, then it is considered to be an acceptable placement. If not, the source of the Wi-Fi, whether AP 102 or the mesh node 104, is moved until acceptable throughput is achieved.

In addition, CSI information is captured during the initial throughput test and is fed to an AI engine. The AI engine can determine an interference level and obstacles using the subcarrier's amplitude and phase information. This analysis is done using a model which will help understand the possible obstacles, both static and dynamic, within the system. A standard CSI analysis includes a review of the signals that are exchanged between the two Wi-Fi points, in this case the client device and the access point as shown in FIGS. 2 and 3. A fingerprint database is created which shows the preferred fingerprint for the communication. In an indoor environment, the wireless signal can be obstructed by all obstacles existing in the environment and the signal can be reflected and diffracted to form a multipath effect. Different objects interfere differently with the transmission route and in addition, the location of the respective nodes, whether the client device 116 or the AP 102, can create different signal characteristics. This difference can be described as a fingerprint feature, and the process of fingerprint creation and the matching of signals characteristic to an unknown location can occur with the exact information stored in a fingerprint database to match the best positioning result.

The system is dynamic because as the objects in the Wi-Fi coverage zone change over time, the throughput is sensed, and if reduced below the threshold, the user is provided an alert to take images of objects in the Wi-Fi coverage zone, then the system will compare the objects in the second image to objects in the first image and provide an indication of the objects that are different. Then, using the CSI analysis, the system will indicate which object is likely causing this difference that has reduced the Wi-Fi throughput.

The indoor fingerprint localization technology includes the step of collecting the position data and then analyzing the data in real time. Such fingerprint features can be identified based on our SSI signals, the signal-to-noise ratio and other parameters. The use of CSI has the advantages of stability, frequency diversity and providing a better picture of the multipath effect of the environment in the presence of a Wi-Fi signal. The above features about the CSI of a Wi-Fi signal are known, and described in the art, one example of which is found in an article titled "A Novel Passive Indoor Localization Method by Fusion CSI Amplitude and Phase Information", by Dang et al. published online 2019 Feb. 20 by MPDI, incorporated herein by reference and available at this internet site: https://www.mdpi.com/1424-8220/19/4/875. Further descriptions as provided by this publication will not be provided in detail, since it is a matter of public record, but the use of CSI within the present disclosure and inventive network system will be described herein.

During the initial setup, the user can stand at different locations and collect a number of CSI packets. Each packet will include phase information and amplitude information. Information about the signal, such as the standard deviation, and other information can be used in order to create the final CSI signal characteristic. In addition, there are various channels and their subcarriers can also be sensed. Various packets can be examined to determine the features of various channels to extract phase information about the environment. The CSI phase as received and transmitted between the client device 114 and the AP 102 will be sensed and stored. Using these factors, such as amplitude phase information and other data, a fingerprint is created of the current environment in which the network operates. During the initial setup of the system, or some later point in time a fingerprint is therefore created of the CSI information which includes specific information about phase and signal propagation of each channel and each subcarrier.

This fingerprint is then stored in the memory 312 of the client device 114 and/or 116. It is also stored in a memory 225 within the access point 102 and/or mesh node 104. The fingerprint includes significant information including the time stamp for when all of the data was collected as well as the throughput of the system during the collection process and other factors as are known in the art.

According to one embodiment, at the same general timeframe that the first fingerprint is generated and stored in the memory 312, the user 117 will use the camera on the client device 114 in order to scan and input an image of the entire environment of the network. Namely, the user 117 will put the camera on the client device 114 in a scan mode video mode and take several pictures of the environment in which the network is set up. Alternatively, or in addition, the user may take a video of the entire room and include in the video the location of the access point 102. Similarly, the user 117 can take photographic images, videos or other pictures of the other rooms within the network, for example, the room 429 which includes the mesh node and the room 431 which is the library in which a second user is likely to have use of the client device 116. Each of the local environments for the respective Wi-Fi capable units, such as the access point 102 and the mesh node 104, are stored in the memory as visual representations of the environment at the time that the first fingerprint is collected. Further, these photographs are associated with that first fingerprint so that at a later point in time, the user 117 is able to view the images of the room with the objects in the state in which they existed when the first fingerprint was created.

The image taken by the camera can be analyzed using object recognition technology, many types of which are available in the art of image technology today. For example, the type of object can be sensed by the smart imaging technology to be a person; the face of a person; a picture of a person; a table; a chair; an appliance, such as a stove, microwave, refrigerator, coffee maker, etc.; a filing cabinet; a couch or other types of objects. Advanced image analysis might be used to classify more details within the type of image, for example, is the person male or female, the brand of coffee maker, microwave, stove, and even the model number of the appliance by performing an image search on global network, such as the Internet. The system, once the brand and/or the model number is known, can then learn details about the appliance to determine the amount of metal, if it contains large magnets, Wi-Fi wave reflective surfaces, Wi-Fi wave absorbing material, Wi-Fi wave input or output antennas and other data that can provide an indication of how likely it is that this object will interfere, alter, reflect, refract, absorb or otherwise modify a Wi-Fi signal.

Figure 4B:
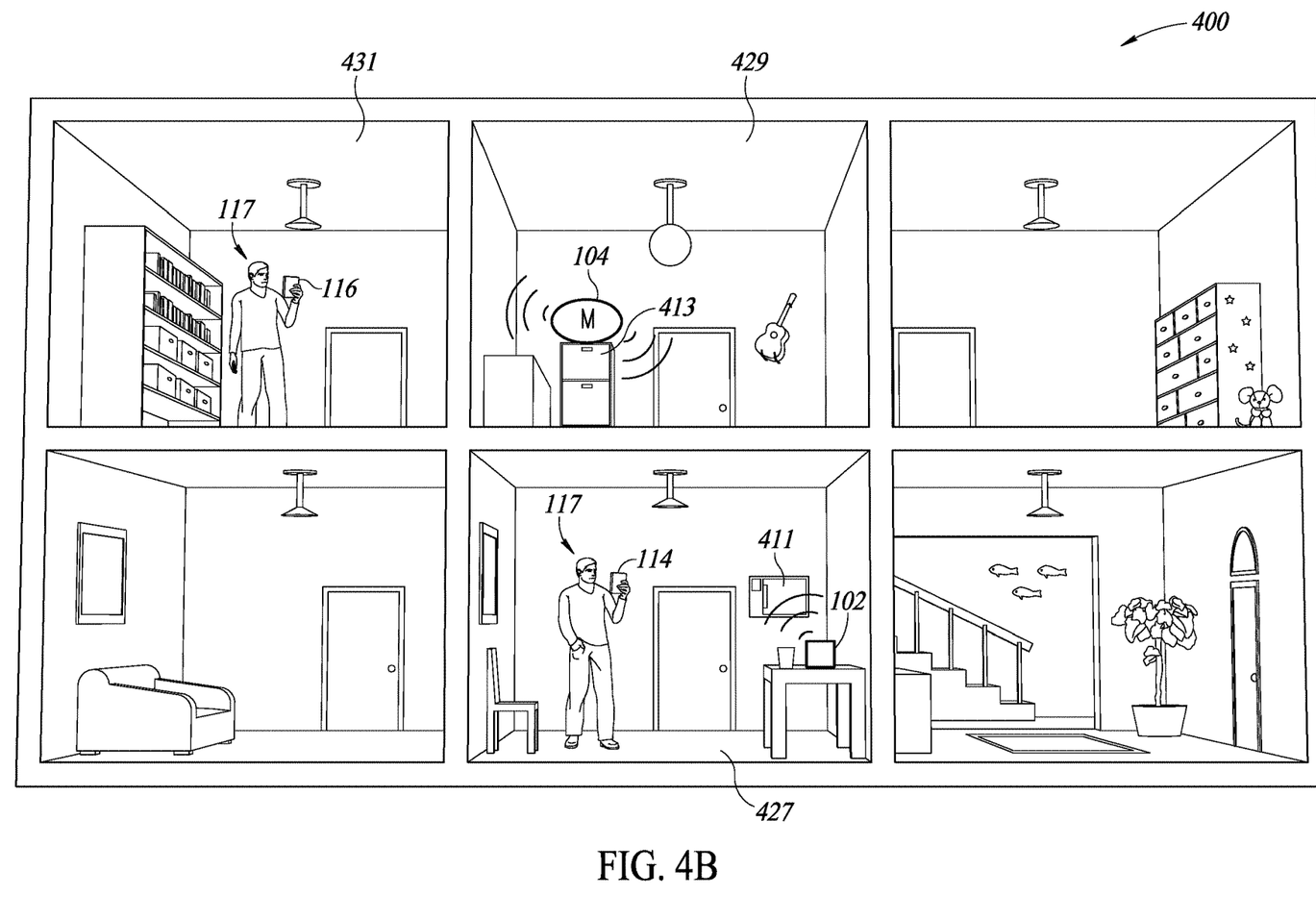
FIG. 4B shows the example Wi-Fi system of FIG. 4A at a second time, after the first time, having different obstacles in the rooms that were not present at the first time.

FIG. 4B illustrates the same home and same location, at a different point in time. At this later time, the local environment has been changed by the addition or moving of different objects in the various rooms. As shown in FIG. 4B, a microwave oven 411 has been attached to the wall of the first room in which the access point 102 is placed. In addition, a metal filing cabinet 413 has been placed in the room in which the mesh node 104 is positioned. A further difference is that the mesh node 104 has now been removed from the wooden bookshelf on which it was placed. It is now positioned on top of the metal filing cabinet 413. At the second point in time, the network has a significant difference in the propagation of the signal. Two additional objects, in this situation represented by the example of a microwave oven and a metal filing cabinet have been positioned adjacent to and, in one case, in the direct pathway of the Wi-Fi signal between two of the devices. While the examples provided are for a microwave oven and metal filing cabinet, the objects 411 and 413 can be any object which causes a distortion in the propagation of the Wi-Fi signal.

The presence of the microwave oven will cause a significant variation in the signal propagation from the access point 102. This variation will be more likely the cause of a reflection of the signal. Namely, the signal may reflect off of or be refracted from the microwave oven 411 which has been placed on the wall some distance from the access point 102. The metal filing cabinet 413 will also have a significant impact on the fingerprint of the CIS signal characteristics, but it will be significantly greater because it may cause scattering and blocking. A normal user 117 may not recognize immediately that the signal propagation is drastically affected by adding a microwave oven 411 to the room or placing the mesh node 104 on top of a metal filing cabinet. However, the various users 117 with their respective client devices 114 and 116 will notice that there is a significant decrease in the Wi-Fi throughput.

Due to the interference caused by adding the objects 411 and 413 to the local environment of the network, the throughput falls below the selected threshold. The sensors 212 and 308 will recognize that the throughput is below the selected threshold and output an alert signal on the client device 114 to let the user know that the throughput has dropped. The user therefore receives an indication on their client device that the throughput has been degraded. The client device 114, such as a smartphone will have a software application, commonly known as an app installed thereon which is able to perform the function of creating a fingerprint of the CSI for that particular localized network. This can be the same processor and memory that was previously used to create the first fingerprint. Based on the alert having been provided, the user will access the app stored on the client device 114 and instruct the app to perform a second analysis of the system to create another current fingerprint of the local environment, at the second point in time after the local environment is changed.

The second fingerprint will have a number of different characteristics from the first fingerprint. These characteristics will provide some indication of the changes in the environment between the first fingerprint and the second fingerprint. In a fingerprint local localization algorithm, a number of different reference points are used within the fingerprint itself to determine the parameters that affect the performance of the system. Of course, more reference points will result in better positioning, generally, the number of reference points can be based on the size and environment and having somewhere in the range of 25 to 50, or perhaps 100 reference points, is sufficient for the generation of an acceptable comparison between two different fingerprints created two different times. The fingerprints will provide an indication to the user of a significant change in environment and the general indication of how the propagation has changed. However, the CSI fingerprints are not sufficiently detailed to provide the user the exact location or type of object that has caused the change in the fingerprints. The user will then take the next step in order to identify the exact object which has made the change in the fingerprint. This is performed as shown in FIG. 4B by the user making use of this image sensor in the client device 114. As is known, nearly all smart devices, such as a mobile phone, have within them a camera. The app on the mobile phone which is performing the analysis will have access to the camera of the mobile device. Therefore, the difference in the fingerprints using the CSI information is provided for assistance in identifying the possible obstacles in the directions and the behaviors of the obstacle even though it cannot pinpoint exactly the obstacle itself. The user 117 can therefore use the mobile phone camera and computer vision in order to pinpoint specific obstacles and help the user understand exactly which obstacle has caused the interference in the system.

After the photographic, whether video or still photograph, data has been collected by the user in FIG. 4B, this can be compared electronically using photographic comparison data to the image data that was collected during the first fingerprint collection process. The images of the respective rooms, such as 427, 429 and 431 can therefore be compared with each other at the point in time the first fingerprint was created, and then, at the second point in time when the second fingerprint was created. Using computer vision and software between images taken at the different points in time, the differences between the two rooms can be brought to the attention of the user 117.

Alternatively, in some embodiments, the user will not have obtained an image when the first fingerprint was created, but will have an image at the time the second fingerprint is created. This image can be used in order to direct the user towards objects which may be interfering with the signal by comparison to the variations in the phase and amplitude within the CSI fingerprint.

Based on the user's review of the image taken at the second point in time, whether it is the only image or a comparison of the prior images, the user is able to pinpoint the objects which have changed the propagation of the signal. This will assist the user 117 when deciding how to change the system in order to restore it to sufficient throughput above the selected threshold. For example, the user may elect to move the table holding the access point 102 to the other side of the room to be further away from the microwave oven 411. Alternatively, the user may elect to remove the microwave oven and put it in a different location. Similarly, the user will be alerted that the metal filing cabinet 413 having the mesh node 104 exactly on top of it provides a significant interference and causes significant distortions in the phase and amplitude and other characteristics of the signal. The user will therefore be alerted to place the mesh node 104 back on the wooden bookcase and then test the system again to determine whether or not the throughput is above the selected threshold. Thus, the user has the option with respect to room 429 to either remove the metal filing cabinet 413 or to maintain it in place and move the mesh node 104 to a different location.

Figure 5A:
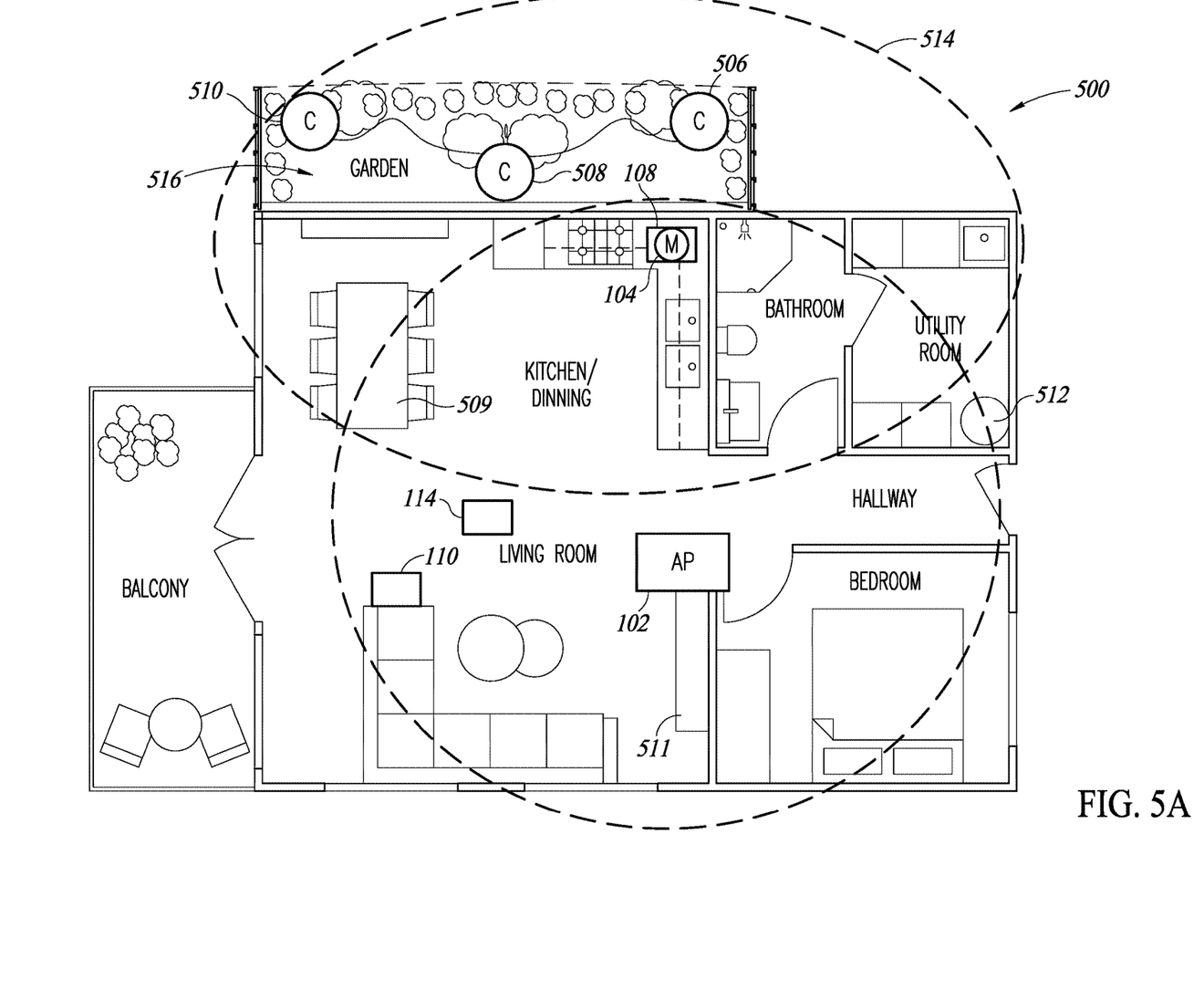
FIG. 5A shows an example Wi-Fi system in a single-floor house at a first time in accordance with embodiments described herein.
Figure 5B:
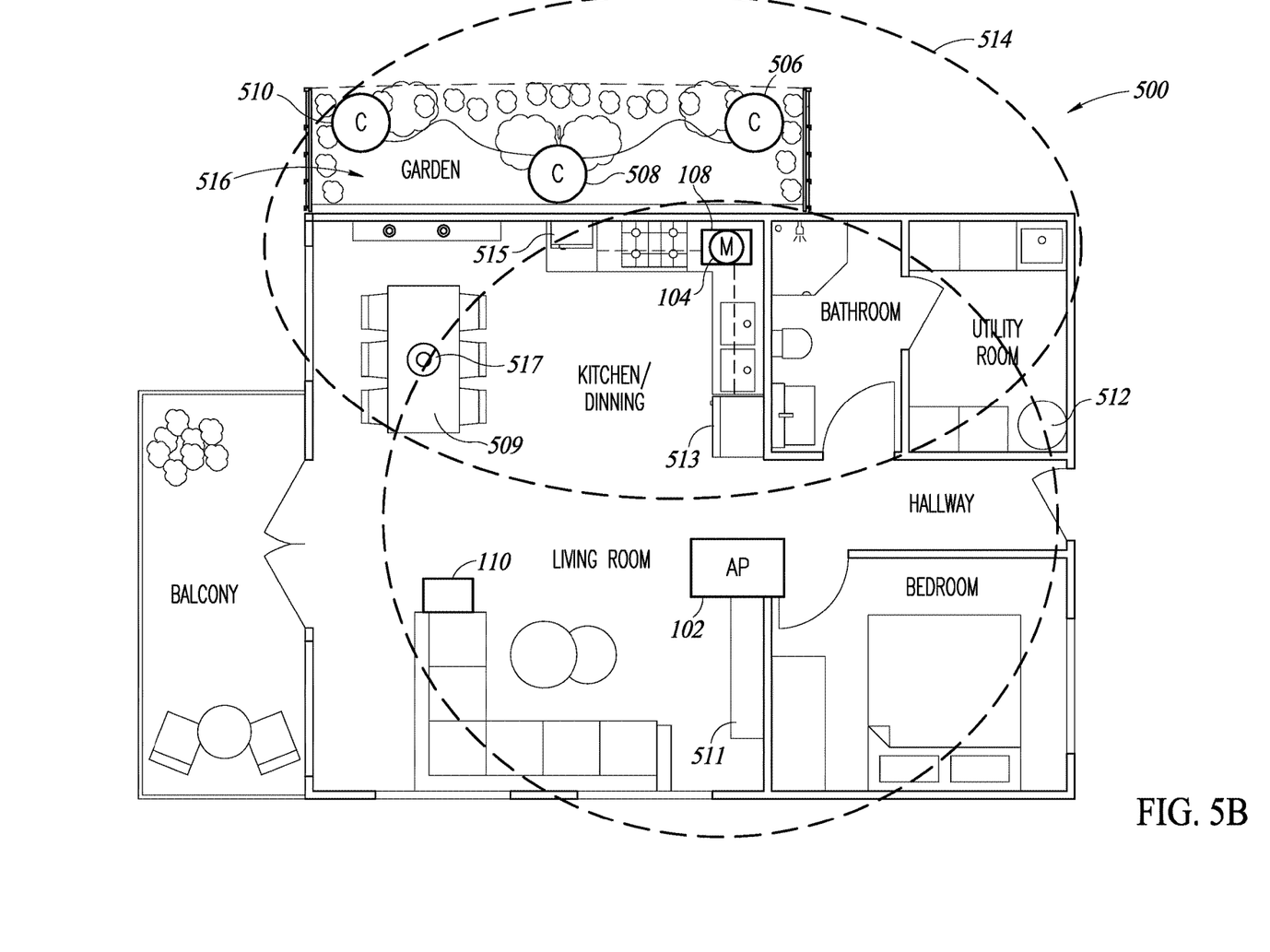
FIG. 5B shows the example Wi-Fi system of FIG. 5A at a second time, after the first time, having different obstacles in various locations that were not present at the first time.

FIGS. 5A and 5B illustrate a somewhat different environment than the multi-story multiple room environment of FIGS. 4A and 4B. In particular, in FIG. 5B all of the nodes and the client devices are on the same level. In addition, the objects which have changed have a different type of impact on the propagation signal, as will now be explained.

FIG. 5A shows an access point 102 positioned on a bookcase 511 at a central location in a home environment. The access point 102 has a coverage area indicated by coverage 512. Within this coverage 512 a mesh node 104 is located which is plugged into a docking station 108. The location for the access point 102 was selected after performing a number of data collection steps using the sensors for the CSI and creating a fingerprint for the CSI based on that AP at that location. In addition, at the same time the first fingerprint was collected, the user obtained an image of the environment in which the AP 102 was operating. This was done using the techniques previously described, for example taking photographs, a video, or other technique to capture and store a representation of the local environment. The images collected are stored in the memory of the local client device and can also be stored in the access point 102 and the mesh node 104. The images are tagged to be associated with the fingerprint of the CSI signal collected within the same timeframe. As will be appreciated, multiple client devices can be present in FIG. 5A within the area 512 for the coverage of the access point 102. Or, a single client device may be moved to different locations within the area 512 in order to collect a complete and comprehensive fingerprint of the area. Specifically, two, three, four, or more different client devices can be at different locations and each create a fingerprint of the CSI signal for their respective locations, after this collection the information can be sent to a common client device or sent to the access point 102 which will filter, store, and sort each of them separately. In addition, the software and the access point 102 can create a combined fingerprint which includes data from all of the collected fingerprints. As a further alternative, the same client device 114 can collect data at dozens, or 100 different locations of the CSI signal characteristics and the access point 102 can receive each of these and combine them to create a complete fingerprint.

In a similar matter, a CSI fingerprint can be created for the area 514 within the operation of the mesh node 104. Thus, the mesh node 104 will have its own separate CSI fingerprint based on the area that it covers and the rooms and the contents of the rooms. The area 514 covered by the mesh node 104 has three different client devices therein, 506, 508 and 510, each of them in the garden area as can be seen. Each of these different client devices collects CSI data based on their interaction with the mesh node 104. A fingerprint is thereafter created for each of these locations in which the CSI information is obtained. Accordingly, a comprehensive map of the area 514 can be determined. Each of the client devices 506, 508 and 510 have the circuits and function previously described with respect to client device 116, and will therefore not be repeated here. Further, each of these client devices have image collection sensors, such as a camera or LiDAR, in which they can collect data about the surrounding environment at the same point in time in which the first fingerprint for the CSI of the mesh node 104 is collected.

FIG. 5B shows the same home and rooms of FIG. 5A except that different objects have been added to the environment. In particular, the access point 102 remains on top of the bookcase 511 and the mesh node 104 remains connected to the docking station 108. Their locations have not changed. However, a refrigerator 513 has now been positioned between the access point 102 and the mesh node 104. Further, a microwave oven 515 has been positioned right at the edge of the area 512 and very near mesh node 104. Further, a metal vase 517 has been positioned on top of the table 509 at the edge of the area 512 and fully within the area 514 of the mesh node 104.

With these new objects in the area of FIG. 5B, the throughput connection for client device 506 to mesh node 104 is not affected. No objects have been placed between the path and it remains a relatively short and barrier-free distance, save for a wall composed of wood which does not degrade the signal in a significant way. Unfortunately, the refrigerator 513 is positioned between the access point 102 and the mesh node 104, which will significantly degrade the communication between these two points. Since the client device 506 is outside of the access point sphere the communication from the mesh node to it will be degraded because the communication from the access point to the mesh node has been degraded.

In the situation in which the client device 506 does not sense the degradation in the signal between it and mesh node 104, no steps will be taken to alter the environment, however, the client device 506 will note that there has been a significant degradation in the Wi-Fi throughput and therefore will send a note to the mesh node 104 to investigate the result that may have caused the degradation and throughput. The mesh node 104 will receive the alert from the client device 506 and would be prompted to begin an investigation of the loss of throughput. Accordingly, the mesh node 104 would use its onboard sensor 212 in order to investigate the source for the Wi-Fi throughput having dropped below the threshold between it and its access point 102. A new fingerprint will be created of the CSI signal that will be able to determine that an obstacle, in this case a refrigerator 513, has been placed directly between the access point and the mesh node 104. After this has been determined a visual image, such as taken by photograph, it can be obtained at the second point in time for the second fingerprint which can more particularly pinpoint the exact location of the new obstacle which has been placed between the access point 102 and the mesh node 104. After the location of this obstacle is determined, the user may then make a decision regarding a small movement of the access point 102, for example, moving it from AP 102 location to coffee table 110. By placing the access point 102 on the coffee table 110 in FIG. 5B, now the signal has a clear path to the mesh node 104, and the area 512 will still have sufficient room in order to include the mesh node 104. Thus, the signal can be restored to high throughput of the Wi-Fi signal above the selected threshold.

At the same second time, or perhaps a third or fourth time, additional objects may be placed in the home which impact the CSI signal. For example, metal vase 517 may be placed on the table 509. Since the vase 517 is at the edge of the area 512 for the access point 102, it will have little impact on the propagation of that signal, but it may impact the propagation of the signal if a person is sitting at the table 509 using a client device 114. Also, a microwave oven 515 or other kitchen appliance may be placed between the mesh node 104 and the client devices 508 and 510. Each of these client devices 508 and 510 will periodically run a fingerprint generation program in order to determine changes in the local CSI signal. After the new fingerprint is created from point in time this can be compared to the prior fingerprint signals stored at different points in time.

As fingerprints for the CSI signal are created at different points in time, images can also be created of the environment so that objects which changed the fingerprint can be more easily identified. After the objects have been identified, then they can be properly accommodated for by either moving the object, changing the location of the access point, or the mesh node, or other steps in order to increase the Wi-Fi throughput above the selected threshold.

One example that has been provided for the image sensor 314 of the client device 116 is the camera of a mobile smartphone. The client device can be a computer notepad, a notebook or other computing device with a processor and a camera. It is beneficial to use a camera in the client device in order to obtain the images at the first and second times. The executable program can be an application on the client device, such as the smartphone. As can be appreciated, other image sensors besides the one in the smartphone can be used. For example, if the user does not want to make use of their mobile phone camera, different technologies such as local LiDAR can be used. Additionally, security cameras which may be inside or outside the home may be used to obtain the visual image.

Figure 6:
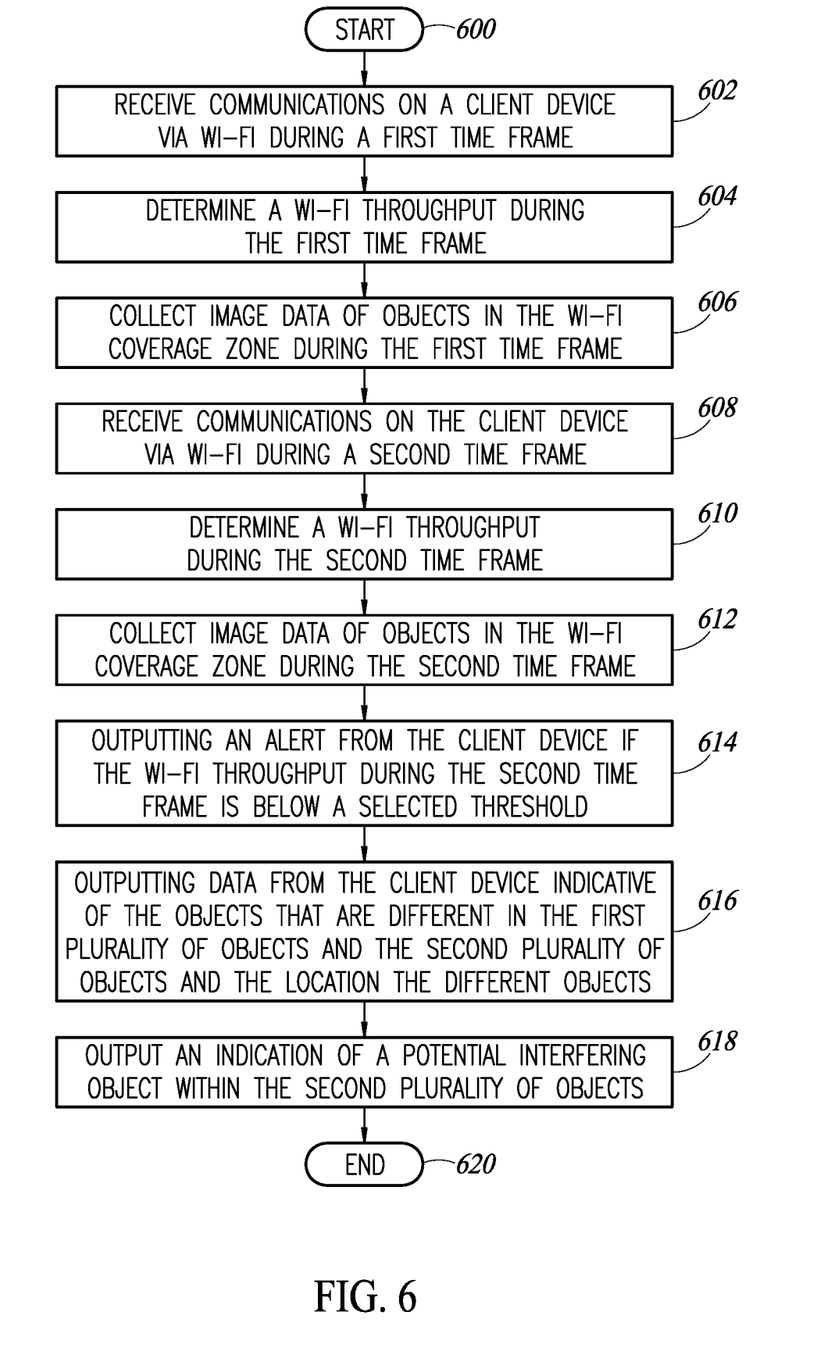
FIG. 6 is a flow chart of a method of using CSI to improve network operations.

FIG. 6 provides a flow chart for carrying out a method according to the current disclosure. The steps include the following: receive communications on a client device via Wi-Fi during a first time frame at 602. Determine a Wi-Fi throughput during the first time frame at 604. Collect image data of objects in the Wi-Fi coverage zone during the first time frame at 606. Receive communications on the client device via Wi-Fi during a second time frame at 608. Determine a Wi-Fi throughput during the second time frame at 610. Collect image data of objects in the Wi-Fi coverage zone during the second time frame at 612. Output an alert from the client device if the Wi-Fi throughput during the second time frame is below a selected threshold at 614. Output data from the client device indicative of the objects that are different in the first plurality of objects and the second plurality of objects, and the location of the different objects at 616. Output an indication of a potential interfering object within the second plurality of objects at 618. The program ends at 620.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of improving local Wi-Fi throughput comprising:
    receiving communications at a client device on Wi-Fi during a first time frame;
    determining a Wi-Fi throughput within a Wi-Fi coverage zone during the first time frame;
    receiving first image data, collected during the first time frame from an image sensor, of a first plurality of objects within the Wi-Fi coverage zone during the first time frame;
    receiving communications at the client device on Wi-Fi during a second time frame;
    determining a Wi-Fi throughput within the Wi-Fi coverage zone during the second time frame;
    receiving second image data, collected during the second time frame from an image sensor, of a second plurality of objects within the Wi-Fi coverage zone during the second time frame;
    outputting an alert from the client device and comparing the first image data with the second image data if the Wi-Fi throughput during the second time frame is below a threshold; and
    outputting data from the client device indicative of objects that are different between the first plurality of objects and the second plurality of objects, and respective locations of the objects that are different.

2. The method of claim 1 further including:
    outputting an indication of a potential interfering object within the second plurality of objects.

3. The method of claim 2 wherein the step of outputting an indication of a potential interfering object within the second plurality of objects includes:
   determining objects present in the second image data that are not present in the first image data;
   outputting an indication of respective identities of the objects present in the second image data and not in the first image data; and
   outputting an indication of respective locations of objects present in the second image data and not in the first image data.

4. The method of claim 2 wherein the step of outputting an indication of a potential interfering object within the second plurality of objects includes:
   storing first data on the client device from a channel state information sensor collected during the first time frame while receiving Wi-Fi communications;
   storing second data on the client device from the channel state information sensor collected during the second time frame while receiving Wi-Fi communications;
   comparing a phase difference between the first data and the second data; and
   outputting an indication of changes in the environment where the phase difference occurred.

5. The method of claim 4 further comprising:
   comparing an amplitude difference between the first data and the second data; and
   outputting an indication of changes in the environment where the amplitude difference occurred.

6. The method of claim 1 further comprising:
   creating a first fingerprint of channel state information during the first time frame;
   creating a second fingerprint of the channel state information during the second time frame; and
   outputting a difference between the first fingerprint and the second fingerprint.

7. The method of claim 6 wherein the first and second fingerprint include phase information, amplitude information, frequency information, and signal to noise ratio.

8. The method of claim 1 wherein the image sensor is a camera in the client device.

9. The method of claim 1 wherein the image sensor is a LiDAR imager.

10. A network management system, comprising:
   an access point configured to wirelessly receive and transmit data;
   a memory in a client device;
   an executable program stored in the memory of the client device that in operation:
      stores first data from a channel state information sensor collected during a first time frame;
      senses a Wi-Fi throughput within a Wi-Fi coverage zone of the access point during the first time frame;
      receives a first signal collected during the first time frame from an image sensor, of a first plurality of objects within the Wi-Fi coverage zone of the access point;
      receives second data from the channel state information sensor collected during a second time frame;
      senses a Wi-Fi throughput within the Wi-Fi coverage zone during the second time frame;
      outputs an alert if the Wi-Fi throughput during the second time frame is below a selected threshold;
      generates a signal indicating a difference between the first data and the second data collected during the first time frame and during the second time frame respectively;
      receives a second signal, collected during the second time frame from an image sensor, of a second plurality of objects within the Wi-Fi coverage zone of the access point;
      compares the first signal of the first plurality of objects with the second signal of the second plurality of objects;
      outputs data indicative of a difference between the objects in the first plurality of objects and the second plurality of objects; and
      outputs an indication of an interfering object within the second plurality of objects based at least in part on the difference between the first data and the second data and also at least in part on the difference between the objects in the first plurality of objects and the second plurality of objects.

11. The network management system of claim 10 wherein the executable program stored in the memory of the client device outputs an indication of objects present in the second plurality of objects that are not present in the first plurality of objects.

12. The network management system of claim 11 wherein the executable program stored in the memory outputs an indication of a type of object present in the second plurality of objects and not in the first plurality of objects.

13. The network management system of claim 12 wherein the type of object indicated is selected from a group comprising people, consumer appliances, home decorations, and furniture.

14. The network management system of claim 10 wherein the image sensor is a camera in the client device.

15. The network management system of claim 10 wherein the channel state information (CSI) sensor outputs data related to a subcarrier wave in a channel of a Wi-Fi signal.

16. The network management system of claim 10 wherein the channel state information (CSI) sensor outputs data related to an amplitude of a channel of a Wi-Fi signal.

17. The network management system of claim 10 wherein the channel state information (CSI) sensor outputs data related to a phase of a channel of a Wi-Fi signal.

* * * * *

UNITED STATES PATENT AND TRADEMARK OFFICE
CERTIFICATE OF CORRECTION

PATENT NO. : 12,425,882 B2  
APPLICATION NO. : 18/091205  
DATED : September 23, 2025  
INVENTOR(S) : Arun Pulasseri Kalam et al.

Page 1 of 1

It is certified that error appears in the above-identified patent and that said Letters Patent is hereby corrected as shown below:

In the Claims

Column 20, Claim 10, Line 1:
"first signal collected" should read: -- first signal, collected --.

Signed and Sealed this  
Sixteenth Day of December, 2025

John A. Squires  
*Director of the United States Patent and Trademark Office*